Patented Feb. 10, 1942

2,272,618

UNITED STATES PATENT OFFICE 2,272,618

CERAMIC BODY

Albra H. Fessler and Karl Schwartzwalder, Flint, Mich., assignors to General Motors Corporation, Detroit, Mich., a corporation of Delaware No Drawing. Application May 22, 1936, Serial No. 81,188. In Germany September 11, 1935

15 Claims. (Cl. 106—46)

This is a continuation in part of our prior application Ser. No. 28,632, filed June 27, 1935.

This invention relates to spark plug insulators and similar ceramic bodies made by sintering a formed mass of alumina and silica, with or without a ceramic flux, by firing at a temperature below that of complete fusion.

It has heretofore been the usual practice in the ceramic art to use a certain amount, usually around 50%, of clay, whether ball clay and/or kaolin in order to render the raw batch plastic, so that it may be formed into the desired shapes. These clays contain many impurities, particularly alkalies, which may be present in some instances as mica or feldspar. Practically none of these alkalies is removed in processing and consequently remain in the fired final product as a component of the glass phase where their presence tends to reduce considerably the electrical resistance of the final product at elevated temperatures. Further, in order to produce a nonporous product at the usual firing temperatures of cone 17 or thereabouts (1470–1500° C.), it is general practice to add ceramic fluxes which promote vitrification at these temperatures. The addition of these vitrifying agents together with the inherent alkali impurities of the clay, contribute to produce an exceedingly glass product of the order of 50% glass, in which the crystalline phase is usually predominantly mullite. Hence the physical properties of such a porcelain are dependent upon the physical characteristics of this continuous glass phase. This glass phase, which constitutes half the final ceramic structure, reduces not only the electrical resistance at elevated temperatures but the heat conductivity and the thermal shock resistance as well. Thus the apparent specific gravity of a mullite porcelain will be of the order of 2.60. We have been able to increase this apparent specific gravity from 2.60 to as high as 3.75 with body compositions coming within the scope of this invention. Specific gravity has an important bearing on thermal conductivity and therefore on engine efficiency.

According to the invention non-plastic raw batches of the compositions disclosed herein are made up into insulator shapes by any of the methods described and/or claimed in the following copending applications for patent: Schwartzwalder, S. N. 3,465, filed April 9, 1935, now Patent 2,122,960; McDougal, S. N. 28,661, filed June 27, 1935, now Patent 2,092,001; Schwartzwalder and Rulka, S. N. 28,631, filed June 27, 1935, now Patent 2,092,027; and Fessler and Russell, S. N. 28,630, filed June 27, 1935, now Patent 2,091,973. Of these the method preferred for commercial use is that described in the Schwartzwalder application in which there is mixed with finely ground non-plastic ingredients on the order of 10% Bakelite or other thermo-setting resin together with a few percents of lubricant. From this mixture preforms are made by pressing. The preforms are subsequently subjected to heat and heavy pressure (from 25,000 to 100,000 lbs. per square inch) in suitable molds to produce the desired insulator shape. The molded bodies are then fired in a suitable kiln to relatively high temperatures so as to drive off the Bakelite and cause the crystalline particles to sinter together, forming a dense body.

By firing to temperatures suitable in each case to mature the particular raw batch being processed, it is possible to produce ceramic ware superior in physical properties desirable for spark plug use.

It is well known that ceramic compositions containing 71.8% alumina and 28.2% silica will, theoretically, when fired, produce bodies containing 100% mullite. Actually, owing to incompleteness of the reactions under the ordinary conditions of firing, the resulting product will be found to contain a large preponderance of mullite together with a small residue of glass and corundum crystals. These latter constituents are incidental by-products resulting from failure of the alumina to combine with all of the silica present to form mullite.

Our improved bodies are made of compositions of alumina and silica with the alumina substantially in excess of that required theoretically to produce 100% mullite. There is thus insured in the final product a very substantial proportion of corundum crystals with corresponding improvement in physical properties. The true and apparent densities are increased progressively with increase in the corundum content. The amount of glass phase becomes less as the $Al_2O_3$ content is increased.

To the compositions disclosed hereinafter, fluxes, preferably those of the alkaline earth group such as MgO, which affect least adversely the Te value, may be added to promote recrystallization in firing the ware. Different fluxes may be chosen for their particular effect on promotion of recrystallization, so that the firing temperatures required to mature the ware are economically reduced. The Te value of the finished product is largely dependent on the particular flux used, magnesium compounds being preferred for this reason. However, if the Te value required of a particular ware is not so important, this physical property value may be compromised to attain a lower and therefore more economical firing temperature. The relative effect of different fluxes on maturing temperatures is well known in the art.

We have made satisfactory spark plug insulators from raw batches containing from about 85% to 99% alumina, and from about 15% to 1% silica, the silica being added in a combined form such as an aluminum silicate. Expressed in terms of aluminum silicate content, the raw batch may consist of from 55 to 97% alumina and from 45 to 3% of an aluminum silicate of the sillimanite group. To the batches may be added up to 10% of a suitable flux as previously described. Where a flux is employed the amount of glass is materially increased. Moreover, an increase in the glass component of the final product may also result, in instances where a siliceous flux such as talc is utilized, due to the additive silica derivable therefrom. The following is one example of a suitable raw batch containing flux: 90% alumina, 5% calcined cyanite, and 5% talc.

We may employ as raw materials non-plastic minerals such as those belonging to the sillimanite group (which are all of the composition $Al_2O_3SiO_2$) together with alumina in amount sufficient to bring the alumina content to the desired ratio. The same alumina-silica ratios can, of course, be obtained by employing synthetic compounds of alumina and silica made in the manner well known in the art together with added alumina. If desired some of the alumina and silica may be introduced in the form of clay but never in sufficient amount to produce a plastic body composition for which the large amounts of clay necessary to produce plasticity, for example, on the order of 30% or more, the fired body is characterized by the presence of large amounts of glass which largely determines its physical properties while the properties of our body are determined by the preponderance of crystalline phases.

It will be found advantageous to employ relatively pure components such as calcined $Al_2O_3$, which may be acid washed or treated with borax as described and claimed in the application of Albra H. Fessler, S. N. 729,345, filed June 6, 1934, this product containing as little as 0.14% of the objectionable sodium oxide. We may use in the raw batch mullite of high purity such as is produced from such pure components by the process disclosed in U. S. Patent No. 1,955,821, granted April 21, 1934.

In general, the raw batch may be made up of any desired mixture of natural or synthetically prepared or treated ingredients provided it contains alumina and silica in the ratio indicated with or without the addition of fluxes as specified.

The raw materials are mixed and thoroughly ground to a grain size on the order of about 325 mesh or less and the insulator or other shapes are formed therefrom by the methods described. Obviously, since the raw material is non-plastic it is impossible to produce bodies by the usual plastic methods employed with conventional clay compositions.

Bodies made of compositions falling within the range given above, when fired to temperatures on the order of from cone 30 to 35 have a dense, non-porous structure resulting from the sintering together of the crystals and from the presence of a very small amount of glass occupying any remaining spaces between the crystal aggregates. In spark plug insulators a porosity of a few hundredths of one percent is objectionable because it permits electrical leakage, but even this minute degree of porosity is absent from our improved insulators. It is to porosity of this order of magnitude that we have reference where, in the appended claims, the term "non-porous" is used. In the case of our improved bodies the glass present in the final body is insufficient to of itself produce a non-porous body, sintering being necessary to weld the crystals together to make a gas-tight insulator.

The firing of the bodies is not critical as it is in the case of clay-bonded bodies. Variations of a considerable number of degrees will not adversely affect the product provided sintering temperature is attained.

Spark plugs of the above compositions will be found to possess superior electrical insulating properties at high temperatures, excellent heat shock resistance, high mechanical strength, as well as other properties required in spark plug insulators. With the higher corundum contents there is a marked improvement in thermal conductivity and resistance to heat shock. The new composition is well adapted for the manufacture of crucibles and other articles subject to severe thermal or electrical conditions.

We claim:

1. A spark plug insulator of dense, non-porous, sintered crystalline structure formed by firing, to a temperature below that of complete fusion, a finely ground non-plastic ceramic mixture showing upon analysis from 85 to 99% alumina and from 15 to 1% silica, said insulator consisting predominantly of a sintered mass of crystals with a small proportion of interstitial glass, said sintered crystalline mass including corundum.

2. A spark plug insulator of dense, non-porous sintered crystalline structure formed by firing, to a temperature below that of complete fusion, a finely ground non-plastic ceramic mixture showing upon analysis from 85 to 99% alumina and from 15 to 1% silica, said insulator consisting predominantly of a sintered mass of crystals with a small proportion of interstitial glass, said sintered crystalline mass consisting of mullite and corundum.

3. A spark plug insulator of dense, non-porous, sintered crystalline structure formed by firing, to a temperature below that of complete fusion, a finely ground non-plastic ceramic mixture showing upon analysis from 85 to 99% alumina and from 15 to 1% silica (said silica being incorporated in chemically-combined form) said insulator consisting predominantly of a sintered mass of crystals with a small proportion of interstitial glass, sain sintered crystalline mass including corundum.

4. A spark plug insulator of dense, non-porous, sintered crystalline structure formed by firing, to a temperature below that of complete fusion, a quantity of finely ground non-plastic ceramic mixture showing upon analysis from 85 to 99% alumina and from 15 to 1% silica, together with up to 10% of an alkaline earth flux, said insulator consisting predominantly of a sintered mass of crytsals with a small proportion of interstitial glass, said sintered crystalline mass including corundum.

5. A spark plug insulator of dense, non-porous, sintered crystalline structure formed by firing, to a temperature below that of complete fusion, a quantity of finely ground non-plastic ceramic mixture showing upon analysis from 85 to 99% alumina and from 15 to 1% silica (said silica being incorporated in the chemically-combined form of an aluminum silicate), together with up to 10% of an alkaline earth flux, said insulator consisting predominantly of a sintered mass of crystals with a small proportion of interstitial glass, said sintered crystaline mass including corundum.

6. A spark plug insulator of dense, non-porous, sintered crystalline structure formed by firing, to a temperature below that of complete fusion, a finely ground non-plastic ceramic mixture showing upon analysis from 85 to 99% alumina and from 15 to 1% silica (said silica being incorporated in the chemically-combined form of an aluminum silicate of the sillimanite group), said insulator consisting predominantly of a sintered mass of crystals with a small proportion of interstitial glass, said sintered crystalline mass including corundum.

7. A spark plug insulator formed by sintering at temperatures in the neighborhood of cone 30 or higher into a dense, non-porous substantially crystalline aggregate a mixture of non-plastic material showing on analysis from 85 to 99% alumina and from 15 to 1% silica, said mixture being pulverized to a grain size on the order of 325 mesh or less, the sintered insulator consisting predominantly of mullite and corundum crystals with a small proportion of interstitial glass.

8. A spark plug insulator formed by sintering at temperatures in the neighborhood of cone 30 or higher into a dense, non-porous body a finely ground mixture of non-plastic material showing on analysis from 85 to 99% alumina and from 15 to 1% silica together with up to 10% of a magnesium flux, said insulator consisting predominantly of sintered crystals, including corundum, together with a small proportion of interstitial glass.

9. A spark plug insulator formed by sintering at temperatures in the neighborhood of cone 30 or higher into a dense, non-porous body a finely ground mixture of non-plastic material showing on analysis from 85 to 99% alumina and from 15 to 1% silica together with up to 10% of talc, said insulator consisting predominantly of sintered crystals, including corundum, together with a small proportion of interstitial glass.

10. A spark plug insulator formed by sintering into a dense, non-porous body a highly compressed mixture of non-plastic material made in the form of an insulator showing on analysis from 85 to 99% alumina and from 15 to 1% silica, said mixture being pulverized to a grain size on the order of 325 mesh or less, the sintered insulator consisting predominantly of mullite and corundum crystals with a small proportion of interstitial glass.

11. The method of making dense, non-porous bodies consisting predominantly of corundum and mullite, which consists in preparing a mixture of aluminum oxide and an aluminum silicate, the mixture showing upon analysis from 85 to 99% alumina and from 15 to 1% silica, pulverizing the material to a grain size on the order of 325 mesh or less, shaping the article from the material and firing the article to temperatures on the order of from cone 30 to cone 35 to sinter it into a dense, non-porous mass of corundum and mullite crystals retaining the desired shape.

12. The method of making dense, non-porous bodies consisting predominantly of corundum and mullite, together with a small proportion of interstitial glass, which consists in preparing a mixture of aluminum oxide and an aluminum silicate, the mixture showing upon analysis from 85 to 99% alumina and from 15 to 1% silica, pulverizing the material to a grain size on the order of 325 mesh or less, shaping the article from the batch and firing the article to temperatures on the order of from cone 30 to cone 35 to convert it into a dense, sintered aggregate of corundum and mullite crystals, with the interstices filled with glass, while retaining the desired shape.

13. The method of making dense, non-porous bodies consisting predominantly of corundum and mullite which consists in preparing a ceramic mixture showing upon analysis from 85 to 99% alumina and from 15 to 1% silica, pulverizing the material to a grain size on the order of 325 mesh or less, shaping the article from the mixture and firing the article to temperatures on the order of from cone 30 to cone 35 thereby sintering it into a dense, non-porous mass of corundum and mullite crystals of the desired shape.

14. The method of making dense, non-porous bodies consisting predominantly of sintered crystals, including corundum and interstitial glass, which consists in preparing a ceramic mixture showing upon analysis from 85 to 99% alumina and from 15 to 1% silica, together with from 1 to 10% alkaline earth flux, pulverizing the material to a grain size on the order of 325 mesh or less, shaping the article from the mixture and firing it to temperatures on the order of from cone 30 to cone 35 thereby converting it into a dense, sintered crystalline mass including corundum crystals with the interstices filled with glass, while retaining the desired shape.

15. The method of making dense, non-porous bodies consisting predominantly of corundum and mullite together with a small proportion of interstitial glass which consists in preparing a finely pulverized mixture showing upon chemical analysis from 85 to 99% alumina and from 15 to 1% silica, shaping the article from the mixture and thereafter sintering the article into a dense, non-porous body while retaining its shape.

ALBRA H. FESSLER.
KARL SCHWARTZWALDER.

CERTIFICATE OF CORRECTION.

Patent No. 2,272,618.　　　　　　　　　　　　　February 10, 1942.

ALBRA H. FESSLER, ET AL.

It is hereby certified that error appears in the printed specification of the above numbered patent requiring correction as follows: Page 1, first column, line 28, for "glass" read --glassy--; page 2, first column, line 38, for "which" read --with--; and second column, line 60, claim 3, for "sain" read --said--; and that the said Letters Patent should be read with this correction therein that the same may conform to the record of the case in the Patent Office.

Signed and sealed this 31st day of March, A. D. 1942.

Henry Van Arsdale, (Seal)　　　　　　　　　　　　　　　　　　　　Acting Commissioner of Patents.